United States Patent [19]

Tholl et al.

[11] 4,446,460
[45] May 1, 1984

[54] REMOTE STARTING OF AN INTERNAL COMBUSTION ENGINE

[75] Inventors: Steven G. Tholl, Spanish Fork; John C. Vonkohlar, IV, Springville, both of Utah

[73] Assignee: Transtart, Inc., Provo, Utah

[21] Appl. No.: 281,523

[22] Filed: Jul. 8, 1981

Related U.S. Application Data

[63] Continuation-in-part of Ser. No. 129,931, Mar. 13, 1980, abandoned.

[51] Int. Cl.³ .................... G08C 19/00; F02N 11/06
[52] U.S. Cl. .................... 340/825.69; 340/825.72; 340/696; 340/64; 307/10 AT; 290/37 R; 290/38 R; 290/38 C; 290/DIG. 3; 123/179 BG
[58] Field of Search .................... 340/825.69, 825.72, 340/696, 539, 63–65; 307/9, 10 R, 10 AT; 290/33, 35, 37, 38 C, DIG. 3, DIG. 6, 38 E; 455/352, 353, 603; 180/2 R, 167, 168; 123/179 R, 179 B, 179 BG, 179 G

[56] References Cited

U.S. PATENT DOCUMENTS

| | | | |
|---|---|---|---|
| 3,455,403 | 7/1969 | Hawthorne | 290/DIG. 3 |
| 3,514,621 | 5/1970 | Farmer et al. | 290/37 |
| 3,521,076 | 7/1970 | Hayon | 290/37 |
| 3,603,802 | 9/1971 | Petric | 290/37 |
| 3,604,005 | 9/1971 | Gilmore | 290/38 |
| 3,657,720 | 4/1972 | Avdenko et al. | 290/37 |
| 3,703,714 | 11/1972 | Andrews | 340/539 |
| 3,859,540 | 1/1975 | Weiner | 290/37 |

*Primary Examiner*—Donnie L. Crosland
*Attorney, Agent, or Firm*—Lynn G. Foster

[57] ABSTRACT

An electrical apparatus and method for remotely starting an internal combustion engine, the apparatus being simplified and having transmitting circuitry issuing a predetermined set of coded signals, selectively enabling receiving circuitry and receiver control circuitry by which the engine is remotely started and accessories remotely actuated.

8 Claims, 4 Drawing Figures

REMOTE STARTING OF AN INTERNAL COMBUSTION ENGINE

BACKGROUND

Continuity

This application is a continuation-in-part of copending U.S. Patent Application Ser. No. 129,931, filed Mar. 13, 1980, now abandoned.

FIELD OF INVENTION

This invention relates generally to internal combustion engines and more particularly to a novel apparatus for and method of remotely starting an internal combustion engine.

PRIOR ART

In the past devices have been proposed for remote starting of an internal combustion engine. These proposals are complex, expensive, difficult to install and pose maintenance problems. In respect to the present invention, the past proposed devices are of general interest only. See U.S. Pat. Nos. 3,054,904; 3,455,403; 3,478,730; 3,521,076; 3,530,846; 3,553,472; 3,577,164; 3,603,802; 3,604,005; 3,696,333; 3,788,294; 3,811,049; 3,859,540; 4,080,537 and 4,131,304.

BRIEF SUMMARY AND OBJECTS OF THE INVENTION

In brief summary, the present invention comprises an electromechanical system, including apparatus and method, which enables a user, at a remote location to use a transmitter to selectively enable a receiver which in turn starts an internal combustion engine and, if desired, to operate engine accessories. The receiver comprises circuitry which insures that a correct enable signal has been received; highly simplified reliable and efficient power control circuit accurately causes the starter to engage, the ignition to operate and any desired accessory to function.

With the foregoing in mind, it is a primary object of the present invention to provide an improved electrical device for and method of remotely starting an internal combustion engine.

A further important object is the provision of a simplified, highly reliable system, including method and apparatus, by which an internal combustion engine is started from a location remote from the engine.

An additional paramount object is the provision of a system to pre-start, warm, defrost, heat and eliminate excessive wear on an internal combustion engine and related cab.

Another dominant object is the provision for remote starting of an internal combustion engine and causing one or more engine accessories to also operate.

An object also of significance is the provision of a novel device for remotely starting an internal combustion engine, the device comprising a highly simplified, efficient solid state power control circuit.

In addition it is a dominant object to provide a system for remotely starting the internal combustion engine of an automobile, which system has a long expected life, is reliable and is low cost so as to be economically available to all automobile owners.

A further valuable object is the provision of an improved and simplified system for starting an internal combustion engine having one or more of the following features:

shuts off the starter motor to protect it once engine oil pressure has been established; after remote starting, will not permit an associated vehicle to be driven until the ignition key is inserted and turned to the "on" position; which may be encoded in any one of an infinite number of ways so as to be tamper proof and to avoid inadvertent starting of an incorrect engine; which permits remote engine shutdown.

These and other objects and features of the present invention will be apparent from the detailed description taken with reference to the accompanying drawings.

DETAILED DESCRIPTION OF THE ILLUSTRATED EMBODIMENT

Figure 1:
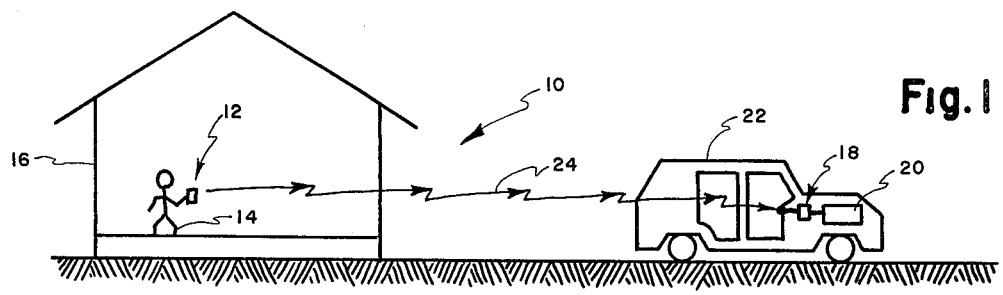
FIG. 1 is a schematic representation illustrating generally the manner in which the present system for remotely starting an internal combustion engine is utilized.

Reference is now made to the drawings wherein like numerals are used to designate like parts throughout and which illustrate a presently preferred electric system for remotely starting an internal combustion engine, generally designated 10. As illustrated in FIG. 1, system 10 comprises a remote transmitter, generally designated 12, which is manually utilized by the operator 14 at any desired remote location within the range of the transmitter 12 (such as in house 16), and a receiver, generally designated 18. The receiver 18 is designed to be associated with an internal combustion engine, such as engine 20 forming part of an automobile 22.

The transmitter is of known and state of the art design, preferably a conventional 9 VDC battery operated, hand held transmitter emitting a 27 bit encoded tone 24 wherein the first bit turns the receiver 18 on and the other bits, if in proper sequence, causes operation and execution by the receiver 18.

Figure 2:
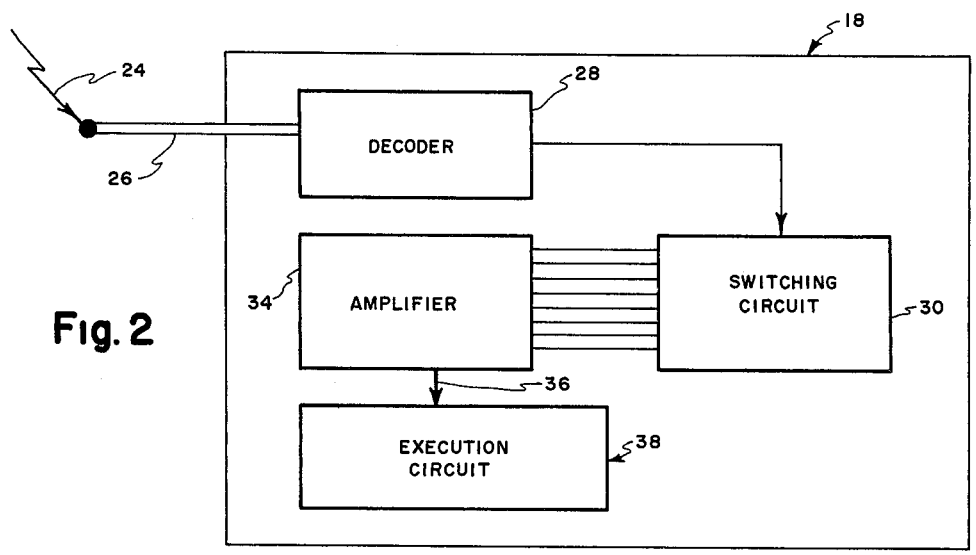
FIG. 2 is a block diagram of the receiver of the system of FIG. 1.

The encoded signal 24 is communicated to the antenna 26 (FIG. 2) of the receiver 18 and thence to a decoder 28 of known type which functions to determine whether or not the encoded signal is valid. If valid, the decoded signal is passed to switching circuit 30 which preferably and conventionally consists of eight switching sites wherein signals are communicated to an amplifier 34. If the signals received by the amplifier 34 have the correct predetermined frequency and tone, a pulse is generated and communicated via lead 36 to an execution circuit 38.

Figure 3:
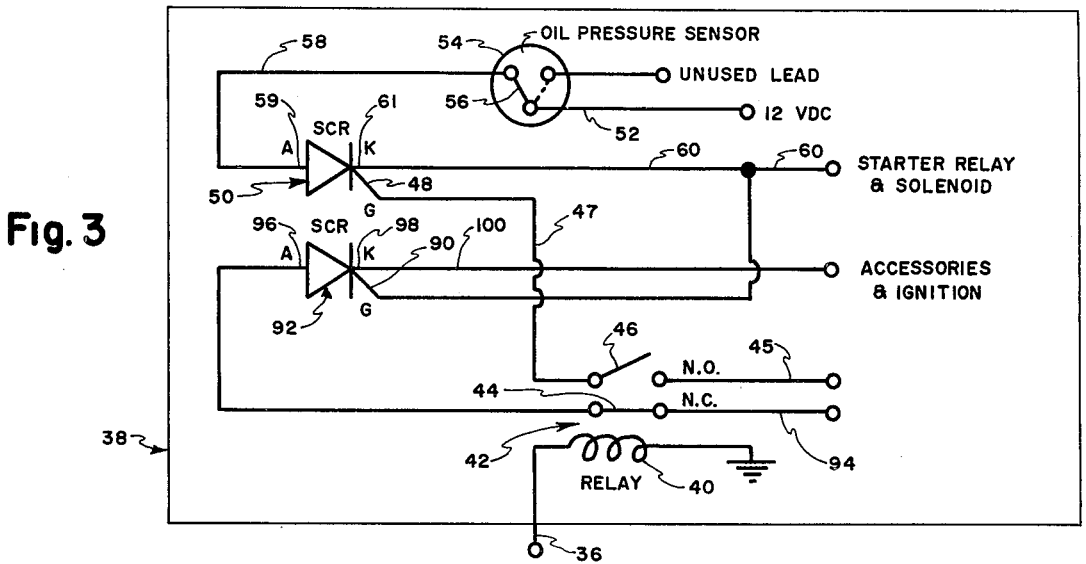
FIG. 3 is a circuit diagram of the execution circuit of FIG. 2.
Figure 4:
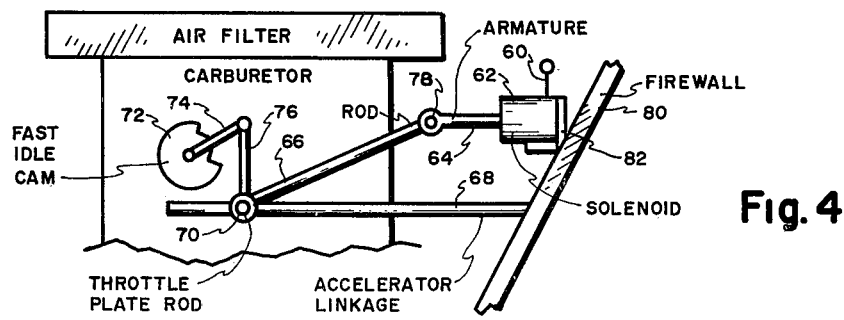
FIG. 4 is a schematic representation of a solenoid and linkage utilized in conjunction with the circuit of FIG. 3 to remotely start an internal combustion engine.

With reference to FIG. 3, when the coil 40 of the relay 42 is pulsed by the signal issued from the amplifier 34 along conductor 36, normally closed switch 44 is momentarily opened and normally opened switch 46 is momentarily closed. When switch 46 closes 2.5 VDC power is communicated along lead 45, across switch 46, along lead 47 to the gate 48 of silicone controlled rectifier (SCR) 50. Thus SCR 50 is triggered and 12 VDC power is communicated along lead 52 across oil pressure sensor 54 at switch 56, along conductor 58, to the anode 59 of SCR 50 across SCR 50 and from the cathode 61 of SCR 50 along lead 60 to energize the starter relay of the internal combustion engine 20 and to energize the coil of solenoid 62. See FIG. 4. This causes extension of the armature rod 64, which in turn advances actuation rod 66 together with accelerator linkage 68. This rotates the existing throttle plate rod 70 and the fast idle cam 72 (via links 74 and 76) to choke the internal combustion engine 20 as the starter bendex rotates the engine. It is to be appreciated that the armature rod 64 is pivotally connected to rod 66 at site 78 and to the accelerated linkage 68 at site 70. Solenoid 62 is illustrated as being mounted to the fire wall 80 of the vehicle 22 upon an L-shaped bracket 82, although other forms of support and other locations could be utilized so long as the solenoid 62 causes the engine to be appropriately choked. The length of travel permitted by the rod 64 may be predetermined so that the appropriate amount of choking action occurs.

With reference to FIG. 3, the 12 VDC power communicated across SCR 50 is also communicated to the gate 90 of SCR 92.

Thus, SCR 92 is triggered to its "on" condition at a point in time when switch 44 of relay 42 is again in its normally closed position such that 12 VDC power is communicated along lead 94, across switch 44 to the anode 96 of SCR 92 and from the cathode 98 thereof along lead to the ignition of the engine 20 and to all accessories desired to be operated, such as the heater and defrost unit of the automobile 22. Once so triggered, SCR 92 continues to deliver power to the ignition and to the accessories. However, once the engine 20 senses oil pressure at sensor 54, switch 56 moves from the solid to the dotted position illustrated in FIG. 3. This terminates delivery of 12 VDC power to SCR 50 which deactivates the starter relay (disengaging the bendex thereof) and causes the solenoid rod 64 to retract into its normal idle position.

Accordingly, the engine continues to run at idle until the operator exercises some contrary control. For example, the operator 14 may cause a second encoded signal to be issued by the transmitter 12 to the receiver 18 which would again momentarily open switch 44 of the relay 42 thereby terminating the delivery of power to the accessories and the ignition. At the same time, the existence of oil pressure as sensed at site 54 would not permit delivery of 12 VDC power to SCR 50 upon the momentary closing of switch 46. Accordingly, the engine 20 would shut off.

From the foregoing it is apparent that the present invention provides for the starting of an internal combustion engine by remote control using solid state electronics so as to eliminate a need of physically starting the engine. Thus, the automobile 22 may be warmed, defrosted and the engine 20 thereof subjected to substantially less wear by providing a substantial interval of time during which the engine 20 is permitted to reach its operating temperature. Damage to the starter relay, bendex and starter motor are provided for. The vehicle cannot be driven until the ignition key is inserted and turned to its "on" position. Each system 10, where multiple systems exist in a common area, will be differently encoded so as to operate on a distinct frequency. Thus, the transmitter and receivers are matched and inadvertent or intentional activation by a third party is avoided. The cost is very low, the circuitry being highly simplified with the execution circuit using only two SCRs as switches to achieve the foregoing results.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A system for remotely starting an internal combustion engine comprising:
   a transmitter from which predetermined coded signals are caused to selectively issue;
   a receiver unconnected and separate from the transmitter, the receiver comprising circuit means comprising means insuring reception of correctly encoded signals of desired frequency and means operable only when correct signals have been received;
   the receiver further comprising execution circuit means connected to and enabled when the operable means are caused to be operable by the correct signals, the execution circuit comprising (a) means actuated by the operable means, (b) first switch means connected to and closed by the actuated means causing electrical power to be selectively delivered to the starter of the engine, (c) second switch means connected to receive and be energized by electrical power issuing from the first switch means, the second switch means communicating electrical power to the ignition of the engine substantially simultaneously with delivery of electrical power to the starter and (d) means opening the first switch means to terminate delivery of electrical power to the starter after an interval of time.

2. A system according to claim 1 wherein the operable means comprise relay means and the first and second switch means each comprise a silicone controlled rectifier, the gate of the first silicone control rectifier being connected to a normally open switch of the relay means which is momentarily closed when actuated and the anode of the second silicone control rectifier being connected to a normally closed switch of the relay means supplying power continuously to the second silicone control rectifier, with the cathode of the first silicone control rectifier being connected to the gate of the second silicone control rectifier.

3. A system according to claim 1 wherein the first switch means selectively delivers electrical energy to means which cause the engine throttle linkage to be displaced to choke the engine only while the starter is engaged.

4. A system according to claim 3 wherein said last mentioned means comprises a solenoid.

5. A system according to claim 1 wherein the opening means comprises a switch which passes electrical power to the first switch means in the absence of a predetermined engine pressure condition and terminates delivery of said electrical power to the first switch means when pressure condition exists.

6. A method of remotely starting an internal combustion engine comprising the steps of:
   causing predetermined coded signals to issue from a transmitter;
   receiving the coded signals at a remote receiver adjacent an internal combustion engine;

evaluating the signals to verify that said signals are correctly coded and of desired frequency and thereafter (a) causing electrical power to be communicated across a first switch to the engine starter, (b) thereafter causing electrical power to be communicated across a second switch to the ignition of the engine and (c) terminating delivery of electrical power to the starter after an interval of time while continuing to deliver power to the ignition.

7. A method according to claim 6 further comprising the step of using electrical power crossing the first switch to cause the engine to be choked while the starter is receiving electrical power.

8. An automatic starting system for an internal combustion engine having a source of electrical power, ignition means, throttle means and a starter motor, the improvement comprising execution circuit means comprising:
    means associated with the throttle means for choking the engine;
    means receiving a command signal;
    first solid state switch means energized by the receiving means following receipt of the command signal to communicate electrical power derived from said source (a) to the starter motor and (b) to the associated means causing the throttle means to choke the engine;
    second solid state switch means energized by electrical power communicated across the first solid state switch means whereby electrical power derived from said source is communicated across the second solid state switch means to at least the ignition means;
    means automatically de-energizing the first solid state switch means after an interval of time.

* * * * *